Nov. 13, 1923.
L. B. SERVIS ET AL
1,473,797
TIRE CHAIN
Filed July 18, 1922
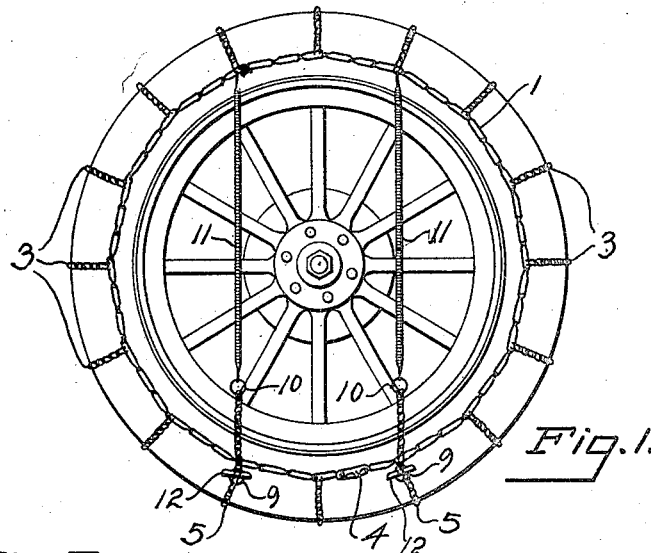
Fig.1.
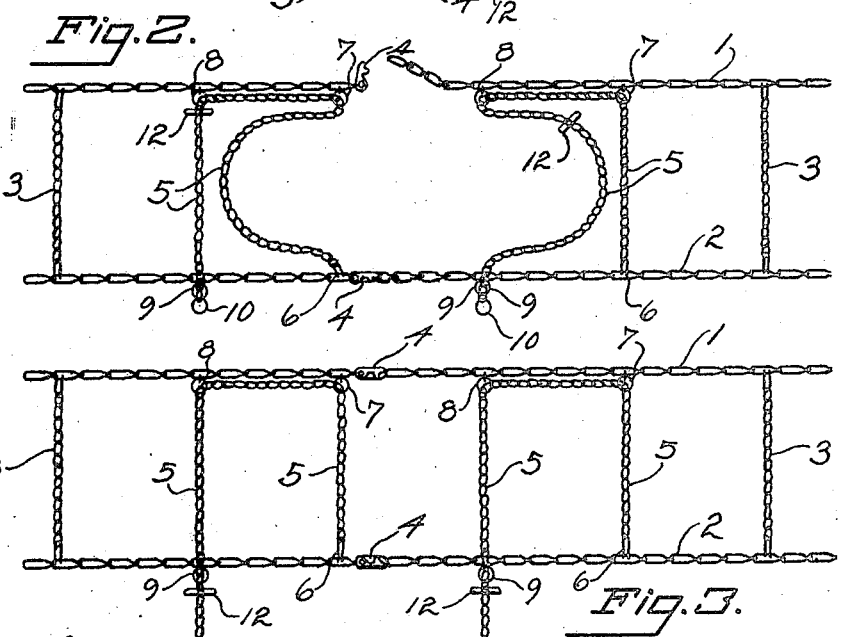
Fig.2.
Fig.3.
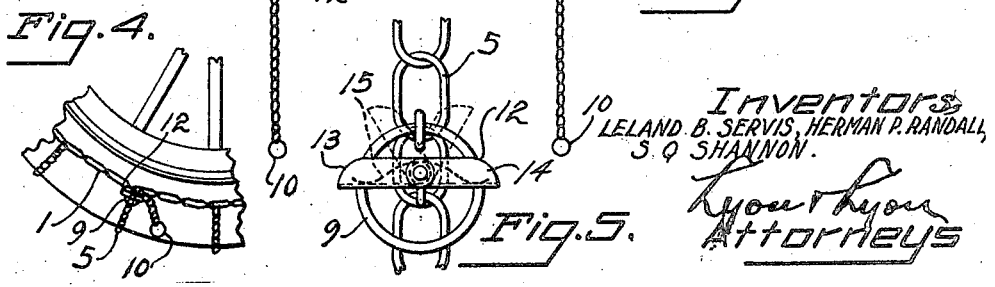
Fig.4.
Fig.5.
Inventors
LELAND B. SERVIS, HERMAN P. RANDALL,
S. Q. SHANNON.
Lyon Lyon
Attorneys Patented Nov. 13, 1923.

1,473,797

UNITED STATES PATENT OFFICE.

LELAND B. SERVIS, HERMAN P. RANDALL, AND S Q SHANNON, OF LOS ANGELES, CALIFORNIA; SAID RANDALL AND SAID SHANNON ASSIGNORS TO SAID SERVIS.

TIRE CHAIN.

Application filed July 18, 1922. Serial No. 575,789.

*To all whom it may concern:*

Be it known that we, LELAND B. SERVIS, HERMAN P. RANDALL, and S Q SHANNON, citizens of the United States, residing at Los Angeles, in the county of Los Angeles and State of California, have invented new and useful Improvements in Tire Chains, of which the following is a specification.

This invention relates to tire chains of the nature employed in rainy or muddy weather to prevent the tires of automobiles, trucks or similar vehicles from skidding. Hitherto, in applying these chains or non-skid devices to a tire, it has been necessary either to jack up the car, free the wheel or tire from the ground, or it has been necessary to run the car on to the chain. Particularly, under the conditions of weather, etc., in which these chains are required, such operations are very disagreeable.

An object of our invention is to provide a chain which may be attached to the tire without any such operations, and which will be self adjusting and may be more easily linked together than any such chain or device hitherto employed.

Another object of our invention is to provide a tire chain with slakable or adjustable transverse members which will facilitate the attaching of the chain to the tire, and a further object of our invention is to provide a means whereby these slacked transverse members may be drawn or tightened up and the chain tightened or properly adapted to the tire.

A further object of our invention is to provide such a device with a catch which will prevent a subsequent slacking or loosening of these transverse members if the tightening means are removed.

Other objects of our invention will be more readily understood from the following description and drawings showing a tire chain embodying the principles of our invention.

Figure 1 illustrates the chain attached to a tire in the final tightened position.

Fig. 2 illustrates the slackable transverse members in the position proper for attaching the chain to the tire.

Fig. 3 illustrates these slackable members in the position which they will occupy after the final tightening on to the tire.

Fig. 4 illustrates one of the slackable members, after the removal of the tension spring, held in position by the catch.

Fig. 5 is an enlarged view of the catch employed on this chain.

The chain may consist of two circumferential chains or members 1 and 2 adapted to fit around each side of the tire. They are provided with a plurality of transverse members 3 connecting the two circumferential chains. These transverse members 3 may consist of simple inter-connecting links as shown or of any of the variety of transverse members or sections in common use. The circumferential members 1 and 2 are provided at their ends with fasteners 4 for attaching the chain to the tire. At the point of the chain where it is joined together, there are provided slackable transverse members 5 which are fastened at one end 6 to the circumferential member 2 and loosely connected by a suitable means such as a ring 7 to the second circumferential member 1, and further loosely connected to a similar ring 8 at a second spaced position on said circumferential member 1 and therefrom loosely connected through a third ring 9 on the first circumferential member 2. The slackable transverse members 5 are preferably provided at their free ends with rings 10. The transverse members 5 are of suitable length to permit a slackening of the members through the rings 7, 8 and 9 to form an opening such as shown in Fig. 2 and which will permit the chain to be readily attached by the fastener 4, while the tire is resting on the ground and without the necessity of moving the tire.

There is provided some suitable means for placing tension on the slackable transverse members whereby they will be tightened and the chain attached to the tire during its rotation. This means preferably consists of springs 11 which may be attached to the rings 10 and connected to the chain at the position on the tire opposite the connecting point. The members 5 may be provided if desired with catches 12 for preventing a subsequent release or slackening of the chain.

These catches may be of any construction which will pass through the rings 9 in one direction but which are adaptable to engage the rings in the reverse direction. As shown in Fig. 5 this catch may be composed of two complementary parts 13 and 14 held in position by a spring 15.

In attaching the chain to the tire the chain is placed around the tire with the connecting ends at the bottom of the tire. By loosening the slack of the transverse members 5 the circumferential members 1 and 2 may be connected by their fasteners 4. The springs 11 are then attached to the rings 10 of the slacked transverse members 5 and stretched to engage the chain at a point opposite the tire as shown in Fig. 1. The attaching of the chain to the tire is then completed. Upon rotation of the tire the springs will draw the slack from the members 5 and the chain will be held in a tightened position as shown in Fig. 1. The catches 12 will have passed through the rings 9 and will be in position so that on the removal of the springs 11, either by accident or otherwise, the members 5 will be prevented from slacking and the chain will be held on the tire. While in actual operation we have found it impossible to throw off the springs 11 by the operation of the vehicle, this catch 12 may be employed as a safety device.

While we have shown the transverse members 5 connected through the three rings 7, 8 and 9, wherein they will traverse the tire twice, it can be readily seen that by taking the free ends from the rings 7 slackable transverse members are provided, or the members might pass through further rings and traverse the tire three or more times, permitting further slackening of the chain. The preferable arrangement of these transverse members 5 is, however, that as shown in the drawings and already described.

We find it preferable in using the chain to have the fastener 4, which is attached to the member 2, permanently closed, it being sufficient in the attachment of the chain that only the rear fastener 4 should be open. In fact, the circumferential member 2 might be one continuous chain.

It is understood that while the herein described chain is well suited for the purposes of our invention, our invention is not limited to the particular embodiment shown but is of the scope set forth in the following claims.

We claim:

1. In a tire chain, means for slacking a transverse member when applying the chain to a tire, and means for placing tension on said slacked member and tightening the chain upon rotation of the tire.

2. In a tire chain, means for slacking a transverse member when applying the chain to a tire, means for placing tension on said slacked member and tightening the chain upon rotation of the tire, and a catch adapted to prevent a subsequent slacking of said transverse member.

3. In a tire chain, a circumferentially extending member for each side of a tire, a transverse member connected to one of said circumferential members and loosely connected to a second circumferential member whereby the member may be slacked, a spring for placing tension on said transverse member whereby the chain may be tightened upon rotation of the tire.

4. In a tire chain, a transverse member loosely connected to one of the circumferential members whereby the transverse member is adaptable to being slacked in attaching the chain to a tire, and a catch for preventing said transverse member being slacked after the chain has been attached to the tire.

5. In a tire chain, a circumferentially extending member for each side the tire, and a transverse member connected to one of said circumferential members, and loosely connected to the second circumferential member in two places and loosely connected again to the first circumferential member whereby the transverse member is slackable.

6. In a tire chain, a circumferentially extending member for each side the tire, and a transverse member connected to one of said circumferential members, and loosely connected to the second circumferential member in two places and loosely connected again to the first circumferential member whereby the transverse member is slackable, and means for placing tension on said slackable member to tighten it during rotation of the tire.

7. In a tire chain, a circumferentially extending member for each side the tire, and a transverse member connected to one of said circumferential members, and loosely connected to the second circumferential member in two places and loosely connected again to the first circumferential member whereby the transverse member is slackable, and a catch positioned to prevent the subsequent slacking of the member.

8. In a tire chain, means for slacking a transverse member when applying the chain to a tire and a spring adapted to being connected with said transverse member and attached to the chain opposite said transverse member for tightening the chain during rotation of the tire.

9. In a tire chain, a circumferential member for each side of the tire, and a transverse member loosely connected to one of the circumferential members whereby the length of said member intermediate the circumferential members may be increased when attaching the chain to a tire.

10. In a tire chain, a circumferential member for each side of the tire, a plurality of spaced transverse members interconnecting said circumferential members, and a transverse member positioned at an end of the circumferential members and loosely connected to one of the circumferential members, whereby the length of said transverse member intermediate the circumferential members may be increased in attaching the chain to a tire.

Signed at Los Angeles, California, this 6th day of July, 1922.

LELAND B. SERVIS.
HERMAN P. RANDALL.
S Q SHANNON.